United States Patent

DeBoer et al.

[11] Patent Number: 5,986,678
[45] Date of Patent: Nov. 16, 1999

[54] MICROFLUIDIC PRINTING ON RECEIVER

[75] Inventors: Charles D. DeBoer, Palmyra; Werner Fassler; Xin Wen, both of Rochester, all of N.Y.

[73] Assignee: Eastman Kodak Company, Rochester, N.Y.

[21] Appl. No.: 08/868,416

[22] Filed: Jun. 3, 1997

[51] Int. Cl.⁶ .................................................. B41J 2/05
[52] U.S. Cl. ................................................ 346/140.1
[58] Field of Search ..................... 346/140.1; 347/101, 347/105, 106

[56] References Cited

U.S. PATENT DOCUMENTS

| | | | |
|---|---|---|---|
| 4,485,387 | 11/1984 | Drumheller | 346/140.1 |
| 4,521,785 | 6/1985 | Matsufuji | 347/105 |
| 5,745,128 | 4/1998 | Lam et al. | 346/140.1 |
| 5,753,360 | 5/1998 | Jones et al. | 347/105 |
| 5,804,320 | 9/1998 | Tomioka et al. | 347/105 |

*Primary Examiner*—N. Le
*Assistant Examiner*—Lamson D. Nguyen
*Attorney, Agent, or Firm*—Raymond L. Owens

[57] ABSTRACT

A method for microfluidic printing continuous tone color pixels on a reflective receiver by using cyan, magenta, and yellow inks, including supplying a fourth, colorless ink along with the cyan, magenta, and yellow inks needed for color printing and pumping the inks through capillary microchannels by microfluidic pumps. The method further includes mixing the correct amount of colorless ink with the cyan, magenta, or yellow inks to produce mixtures of ink having a desired correct hue and tone scale; and transferring the pixels of the ink mixtures to the reflective receiver to form colored pixels on the receiver comprising a support, a layer formed over the support of an ink impermeable material and cavities defined in a surface of the ink impermeable layer and an ink absorbing material disposed in the cavities for absorbing a determinable amount of ink until saturated such that ink is not conveyed to adjacent cavities.

2 Claims, 3 Drawing Sheets

MICROFLUIDIC PRINTING ON RECEIVER

CROSS REFERENCE TO RELATED APPLICATIONS

Reference is made to commonly assigned U.S. patent application Ser. No. 08/868,426, filed concurrently herewith entitled "Continuous Tone Microfluidic Printing", by DeBoer, Fassler and Wen. The disclosure of this related application is incorporated herein by reference.

FIELD OF THE INVENTION

The present invention relates to printing continuous tone photographic quality images by microfluidic pumping of colored inks into specially formulated receivers to prevent smearing and overload of the printed pixels.

BACKGROUND OF THE INVENTION

Microfluidic pumping and dispensing of liquid chemical reagents is the subject of three U. S. Pat. Nos. 5,585,069, 5,593,838,and 5,603,351,all assigned to the David Sarnoff Research Center, Inc., and hereby incorporated by reference. The system uses an array of micron sized reservoirs, with connecting microchannels and reaction cells etched into a substrate. Electrokinetic pumps comprising electrically activated electrodes within the capillary microchannels provide the propulsive forces to move the liquid reagents within the system. The electrokinetic pump, which is also known as an electroosmotic pump, has been disclosed by Dasgupta et al., see "Electroosmosis: A Reliable Fluid Propulsion System for Flow Injection Analyses", Anal. Chem. 66, pp 1792–1798 (1994). The chemical reagent solutions are pumped from a reservoir, mixed in controlled amounts, and them pumped into a bottom array of reaction cells. The array may be decoupled from the assembly and removed for incubation or analysis. When used as a printing device, the chemical reagent solutions are replaced by dispersions of cyan, magenta, and yellow pigment, and the array of reaction cells may be considered a viewable display of picture elements, or pixels, comprising mixtures of pigments having the hue of the pixel in the original scene. When contacted with receiver, the capillary force of the receiver fibers pulls the dye from the cells and holds it in the receiver, thus producing a receiver print, or photograph, of the original scene. One problem with this kind of printer is the rendering of an accurate tone scale. The problem comes about because the capillary force of the receiver fibers remove all the pigment solution from the cell, draining it empty. If, for example, a yellow pixel is being printed, the density of the image will be fully yellow. However, in some scenes, a light, or pale yellow is the original scene color. One way to solve this problem might be to stock and pump a number of yellow pigments ranging from very light to dark yellow. Another way to solve the tone scale problem is to print a very small dot of dark yellow and leave white receiver surrounding the dot. The human eye will integrate the white and the small dot of dark yellow leading to an impression of light yellow, provided the dot is small enough. This is the principle upon which the art of color halftone lithographic printing rests. It is sometimes referred to as area modulation of tone scale. However, in order to provide a full tone scale of colors, a high resolution printer is required, with many more dots per inch than would be required if the colors could be printed at different densities. Another solution to the tone scale problem has been provided in the area of ink jet printers, as described in U.S. Pat. No. 5,606,351, by Gilbert A. Hawkins, hereby incorporated by reference. In an ink jet printer, the drop size is determined primarily by the surface tension of the ink and the size of the orifice from which the drop is ejected. The ink jet printer thus has a similar problem with rendition of tone scale. U.S. Pat. No. 5,606,351 overcomes the problem by premixing the colored ink with a colorless ink in the correct proportions to produce a drop of ink of the correct intensity to render tone scale. However, ink jet printers require a relatively high level of power to function, and they tend to be slow since only a few pixels are printed at a time (serial printing), in comparison to the microfluidic printer in which all the pixels are printed simultaneously (parallel printing). Another possible solution to the tone scale problem is described in the above cross referenced copending application, wherein a colorless ink is mixed with the colored inks to make the light colored pixels that are needed for a continuous tone image. The problem with this method is that the receiver receiver to which the inks are being transferred must be removed at just the right time or too much ink may be pulled from the microchannels which convey it to the receiver. This is particularly difficult to time in conditions where the temperature may vary, because the rate of flow of the ink will be temperature sensitive. If too much ink is pulled from the microchannel apparatus, the densities of the image will be too high, and resolution will be lost, because the expanding pixel of ink will blend with the adjacent pixels. This blending may also cause the color saturation to be reduced. Excess ink will not produce a pretty picture.

It would be desirable to have a receiver for rapidly printing a high quality continuous tone image using a microfluidic printing apparatus.

SUMMARY OF THE INVENTION

The object of this invention is to provide a rapid way to print a high quality continuous tone image and a receiver which is particularly suitable for use in microfluidic printing.

Another object of this invention is to provide a compact, low power, portable printer.

These objects are achieved by a method for microfluidic printing, comprising:
   a) pumping colored inks through capillary microchannels by means of microfluidic pumps;
   b) collecting the correct amount of each kind of ink in a mixing chamber; and
   c) transferring the pixels of mixed ink to a reflective receiver comprising a reflective web support overcoated with a coextensive layer of ink absorbing cells of certain size in an ink impermeable surrounding medium wherein each cell may absorb a determinable amount of ink until saturated and may not convey ink to adjacent cells.

These objects are also achieved by a receiver particularly suitable for use in microfluidic printing where ink is transferred from mixing chambers to the receiver comprising a support, a layer formed over the support of an ink impermeable material and cavities defined in a surface of the ink impermeable layer, and an ink absorbing material disposed in the cavities for absorbing a determinable amount of ink until saturated from the mixing chambers such that it does not convey ink to adjacent cavities whereby the areas of the ink impermeable material between the cavities prevents ink from transferring from the mixing chambers.

ADVANTAGES

The present invention provides high quality continuous tone prints on a receiver wherein there is no intermixing of ink from different pixels.

Another feature of the invention is that the printer is low power, compact and portable.

Another feature of the invention is that the printing process is fast, because all the pixels are printed simultaneously.

Another feature of the invention is that registration errors, banding and other positional error defects are greatly reduced because all the pixels are printed simultaneously.

DETAILED DESCRIPTION OF THE INVENTION

The present invention is described in relation to a microfluidic printers and their receivers. As will be understood by those skilled in the art, whenever the term "photographic quality" is used, it will include not only continuous tone images recorded from nature, but also computer generated images, graphic images, line art, text images and the like.

Figure 1:
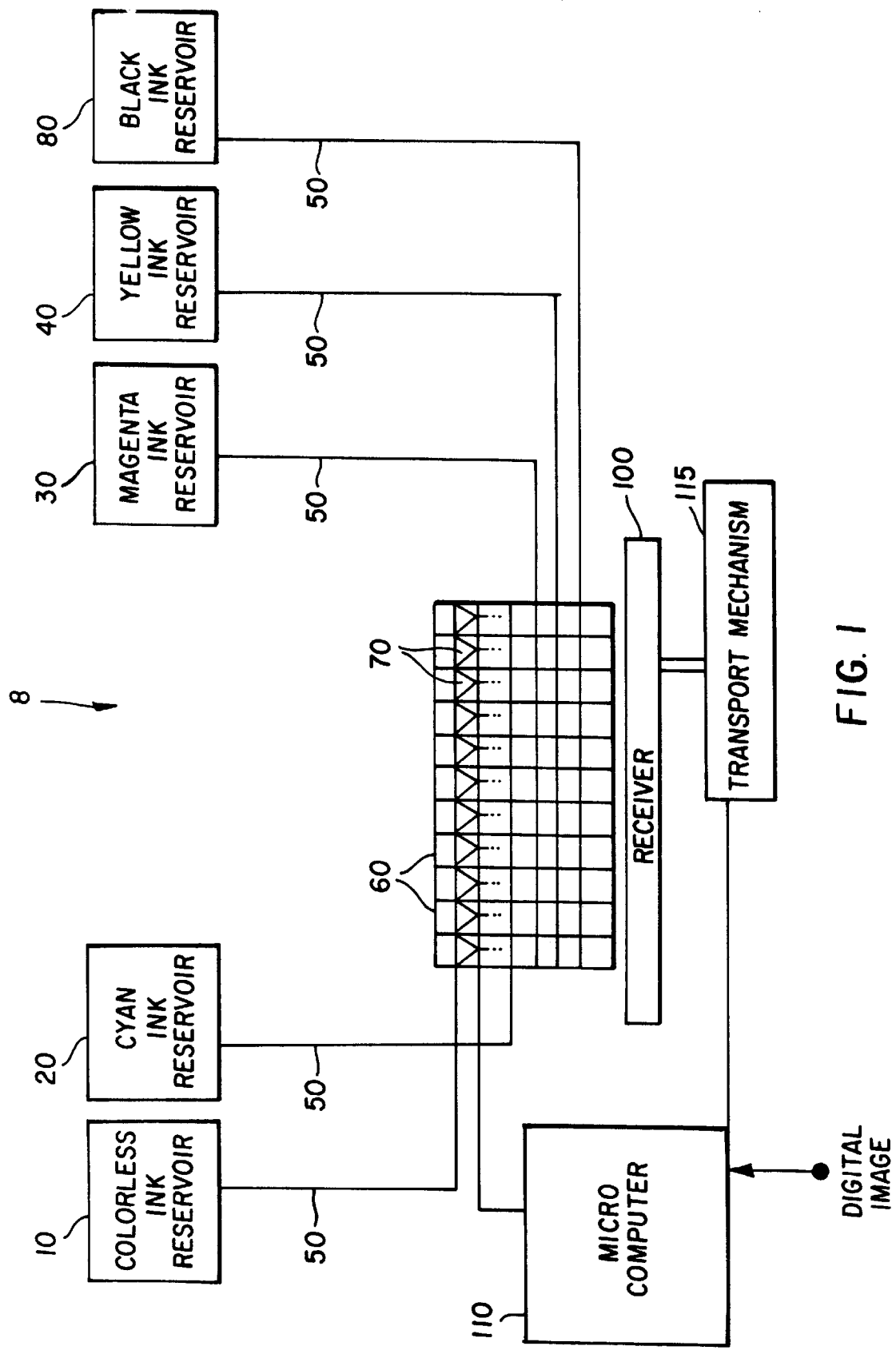
FIG. 1 is a partial schematic view showing an apparatus for pumping, mixing and printing pixels of ink onto a reflective receiver.

Referring to FIG. 1, a schematic diagram is shown of a printing apparatus 8 in accordance with the present invention. Reservoirs 10, 20, 30, and 40 are respectively provided for holding colorless ink, cyan ink, magenta ink, and yellow ink. An optional reservoir 80 is shown for black ink. Microchannel capillaries 50 respectively connected to each of the reservoirs conduct ink from the corresponding reservoir to an array of ink mixing chambers 60. In the present invention, the ink mixing chambers 60 deliver the ink directly to a receiver; however, other types of ink delivery arrangements can be used such as microfluidic channels, and so when the word chamber is described, it will be understood to include those arrangements. The colored inks are delivered to ink mixing chambers 60 by electrokinetic pumps 70. The amount of each color ink is controlled by microcomputer 110 according to the input digital image. For clarity of illustration, only one electrokinetic pump 70 is shown for the colorless ink channel. Similar pumps are used for the other color channels, but these are omitted from the figure for clarity. Finally, a receiver 100 is transported by a transport mechanism to come in contact with the microfluidic printing apparatus. The receiver 100 accepts the ink and thereby produce the print.

Figure 2:
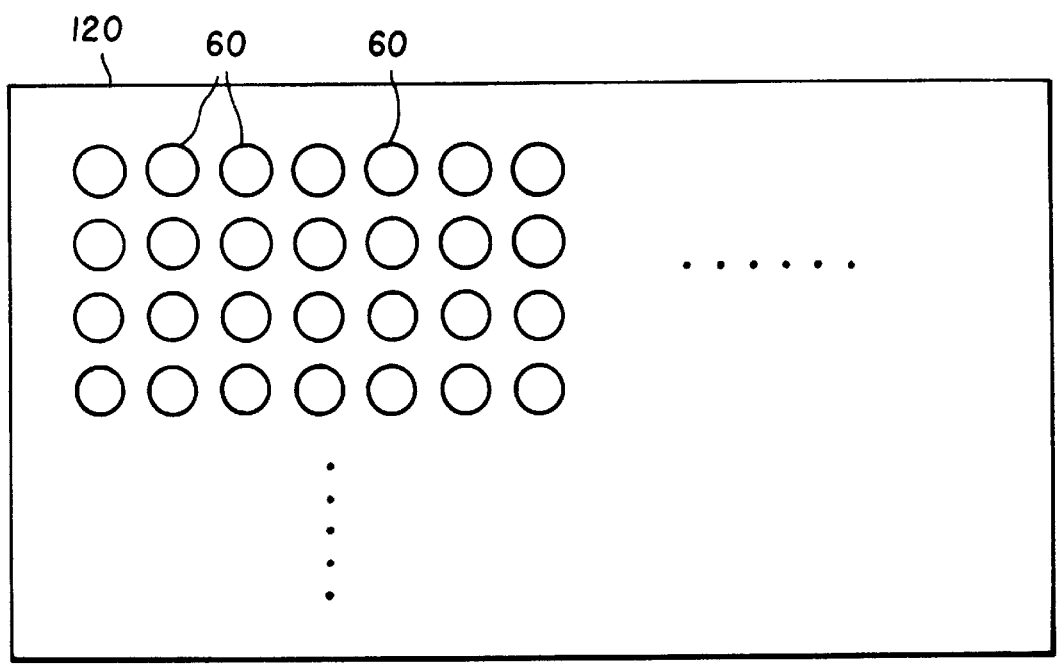
FIG. 2 is a top view of the pattern of the color pixels described in the present invention.

FIG. 2 depicts a top view of the arrangement of mixing chambers 60 shown in FIG. 1. Each ink mixing chamber 60 is capable of producing a mixture of inks having any color saturation, hue and lightness within the color gamut provided by the set of inks used in the apparatus. When used with the saturable receiver of this invention, this results in a continuous tone photographic quality image on the reflective receiver 100.

The inks used in this invention are dispersions of colorants in common solvents. Examples of such inks may be found is U.S. Pat. No. 5,611,847 by Gustina, Santilli, and Bugner. Inks may also be found in the following commonly assigned U.S. patent applications (74250AEK, 74201AEK and 74210AEK) by McInerney, Oldfield, Bugner, Bermel and Santilli, and in U.S. patent application (74595JRE) by Bishop, Simons and Brick, and in U.S. patent application (74683JRE) by Martin. In a preferred embodiment of the invention the solvent is water. Colorants such as the Ciba Geigy Unisperse Rubine 4BA-PA, Unisperse Yellow RT-PA, and Unisperse Blue GT-PA are also preferred embodiments of the invention. The colorless ink of this invention is the solvent for the colored inks in the most preferred embodiment of the invention.

The microchannel capillaries, ink pixel mixing chambers, and microfluidic pumps are all fully described in the patents listed above.

Figure 3:
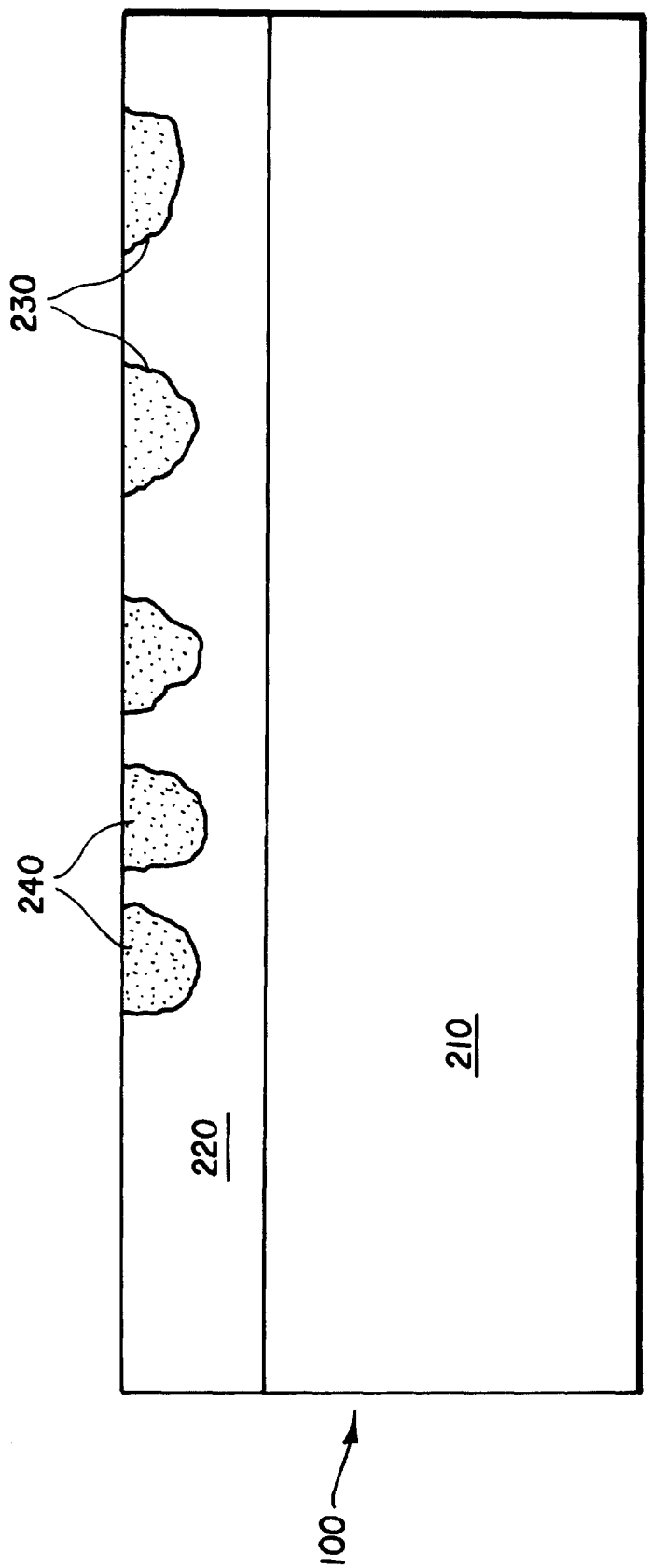
FIG. 3 is a detailed view of the reflective receiver of the invention.

FIG. 3 shows a cross-sectional drawing of the reflective receiver 100. The receiver includes a reflective base 210, coated with a ink impervious medium 220 having deposed in the medium cells, or cavities, 230, which are filled with an ink absorbing element. When contacted with the printer front plate 120 containing the ink pixel mixing chambers 60, the cells, or more precisely, the ink absorbing cell element, absorb the ink from the pixel mixing chambers until they are saturated, at which time the ink absorption ceases. Ink movement in a direction parallel to the base is prevented by the walls of ink impervious medium between the cells. Since the cells are of a fixed and certain size, only a fixed and limited amount of ink can be absorbed by the cell before the cell is saturated. It will be important to match the capacity of the saturable receiver with the amount of ink contained in the printer front plate 120 so that excess ink is not pulled from the microchannels that feed the ink pixel mixing chambers 60.

The reflective base 210 may be receiver, which is reflective by virtue of the light scattering effect of the receiver fibers, and by any fillers such as titanox or barium sulfate which have been added to the receiver, or be a synthetic receiver, which is usually a polymer web which has been rendered reflective by the addition of light scattering centers, usually particles of different refractive index than the polymer, and/or air voids, which also have a different refractive index than the polymer.

The ink impervious medium 220 may be a polymeric coating which is insoluble or unswellable by the ink solvent. If water based inks are used, the polymer may be, for example, polystyrene, cellulose acetate propionate, polyvinylbutyral, polymethylmethacrylate, or any convenient coating polymer that does not absorb or swell in water. It is important that the polymer be essentially colorless so that the hues of the image are not distorted.

The ink cells 230 are essentially voids in the layer 220. They may be formed by embossing, by vacuum forming, by cutting or etching, or by any of the common plastic forming and fabrication methods. As noted above, the size and spacing of the cells should be commensurate to the size and spacing of the ink pixel mixing chambers in the printer front plate of FIG. 2. In a preferred embodiment of the invention, the average diameter of the cells are less than about 10% of the diameter of the ink pixel mixing chambers on the printer front plate, and the average center to center spacing of the cells is no more than 150% of the average cell diameter. This insures that a large number of cells will be in contact with each ink pixel mixing chamber, regardless of the alignment of the receiver with the printer front plate.

The ink absorbing cell element 240 is a material that will absorb the ink effectively and hold the colorant of the ink as a stable image of correct hue. Again, the material must be essentially colorless so that the final image is of the correct hue. The material may be deposited into the cells during manufacture by coating or fluid extrusion, with any excess material removed by a doctor blade. In a preferred embodiment of the invention where the ink fluid is water, the ink absorbing material is gelatin.

The typical printing operation in the present invention involves the following steps. First the printer receives a digital image file consisting of electronic signals in which the color code values are characterized by bit depths of an essentially continuous tone image, for example, 8 bits per color per pixel. Based on the color code values at each pixel, which define the lightness, hue and color saturation at the pixel, the electrokinetic pumps at the corresponding pixel pump the designated cyan, magenta, yellow and clear ink in an amount corresponding to the code value from the ink reservoirs 20, 30, 40 and 80, into the pixel mixing chamber 60. The mixture of inks, which has the same hue, lightness and color saturation as the corresponding pixel of the original image being printed, is held in the mixing chamber by the surface tension of the ink. The reflective receiver 100 is subsequently placed in contact with the ink meniscus of the ink mixing chamber 60 within the printer front plate 120. The mixture of inks contained in the mixing chamber 60 is then drawn into the reflective receiver by the absorbing or mordanting force of the material filling the cells of the receiver. One important advantage of the present invention is the reduction of the printing image defects that commonly occur when the cyan, magenta and yellow inks are printed in separate operations. Misregistration of the apparatus often leads to visible misregistration of the color planes being printed. In this invention, all the color planes are printed simultaneously, thus eliminating such misregistration.

Ink from the black ink reservoir 80 may be included in the colored in mixtures to improve the density of dark areas of the print, or may be used alone to print text, or line art, if such is included in the image being printed.

The invention has been described in detail with particular reference to certain preferred embodiments thereof, but it will be understood that variations and modifications can be effected within the spirit and scope of the invention.

PARTS LIST

| | |
|---|---|
| 8 | microfluidic printing system |
| 10 | colorless ink reservoir |
| 20 | cyan ink reservoir |
| 30 | magenta ink reservoir |
| 40 | yellow ink reservoir |
| 50 | microchannel capillaries |
| 60 | ink pixel mixing chambers |
| 70 | electrokinetic pumps |
| 80 | black ink reservoir |
| 100 | reflective receiver |
| 110 | microcomputer |
| 120 | printer front plate |
| 210 | reflective base |
| 220 | ink impervious medium |
| 230 | ink cell |
| 240 | ink absorbing cell element |

What is claimed is:

1. A method for microfluidic printing comprising:
   a. pumping inks of different colors through capillary microchannels by means of microfluidic pumps;
   b. mixing a correct amount of said colored inks from the capillary microchannels in a mixing chamber to produce a mixture of inks having a desired color saturation, hue and lightness; and
   c. transferring pixels of the ink mixture to a reflective receiver comprising a support, a layer formed over the support of an ink impermeable material and cavities defined in a surface of the ink impermeable layer and an ink absorbing material disposed in the cavities for absorbing a determinable amount of ink until saturated such that said ink is not conveyed to adjacent cavities.

2. A method for microfluidic printing continuous tone color pixels on a reflective receiver by using cyan, magenta, and yellow inks, comprising:
   a. supplying a fourth, colorless ink along with the cyan, magenta, and yellow inks needed for color printing;
   b. pumping the inks through capillary microchannels by microfluidic pumps;
   c. mixing a correct amount of colorless ink with the cyan, magenta, or yellow inks to produce mixtures of ink having a desired correct hue and tone scale; and
   d. transferring the pixels of the ink mixtures to the reflective receiver to form colored pixels on the receiver comprising a support, a layer formed over the support of an ink impermeable material and cavities defined in a surface of the ink impermeable layer and an ink absorbing material disposed in the cavities for absorbing a determinable amount of ink until saturated such that said ink is not conveyed to adjacent cavities.

* * * * *